Oct. 4, 1932.  L. M. WOOLSON  1,880,642
MOTOR VEHICLE
Filed May 6, 1929   2 Sheets-Sheet 1

Inventor
LIONEL M. WOOLSON
Attorney

Oct. 4, 1932.  L. M. WOOLSON  1,880,642
MOTOR VEHICLE
Filed May 6, 1929   2 Sheets-Sheet 2

Inventor
LIONEL M. WOOLSON
By *Milton Tibbetts*
Attorney

Patented Oct. 4, 1932

1,880,642

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed May 6, 1929. Serial No. 360,750.

This invention relates to motor vehicles and more particularly to displays thereof.

An object of the invention is to provide a novelty display for a motor vehicle.

Another object of the invention is to provide a rotary display for a motor vehicle.

Another object of the invention is to provide means for supporting and rotating a motor vehicle on its longitudinal axis.

A further object of the invention is to provide means for supporting a motor vehicle on its longitudinal axis and rotating the vehicle under its own power.

A further object of the invention is to provide means for supporting a motor vehicle on its longitudinal axis and rotating the vehicle by the starting motor therefor connected to a suitable source of electricity.

Other objects of the invention will appear from the following description taken in connection with the drawings, which form a part of this specification, and in which.

Figure 1:
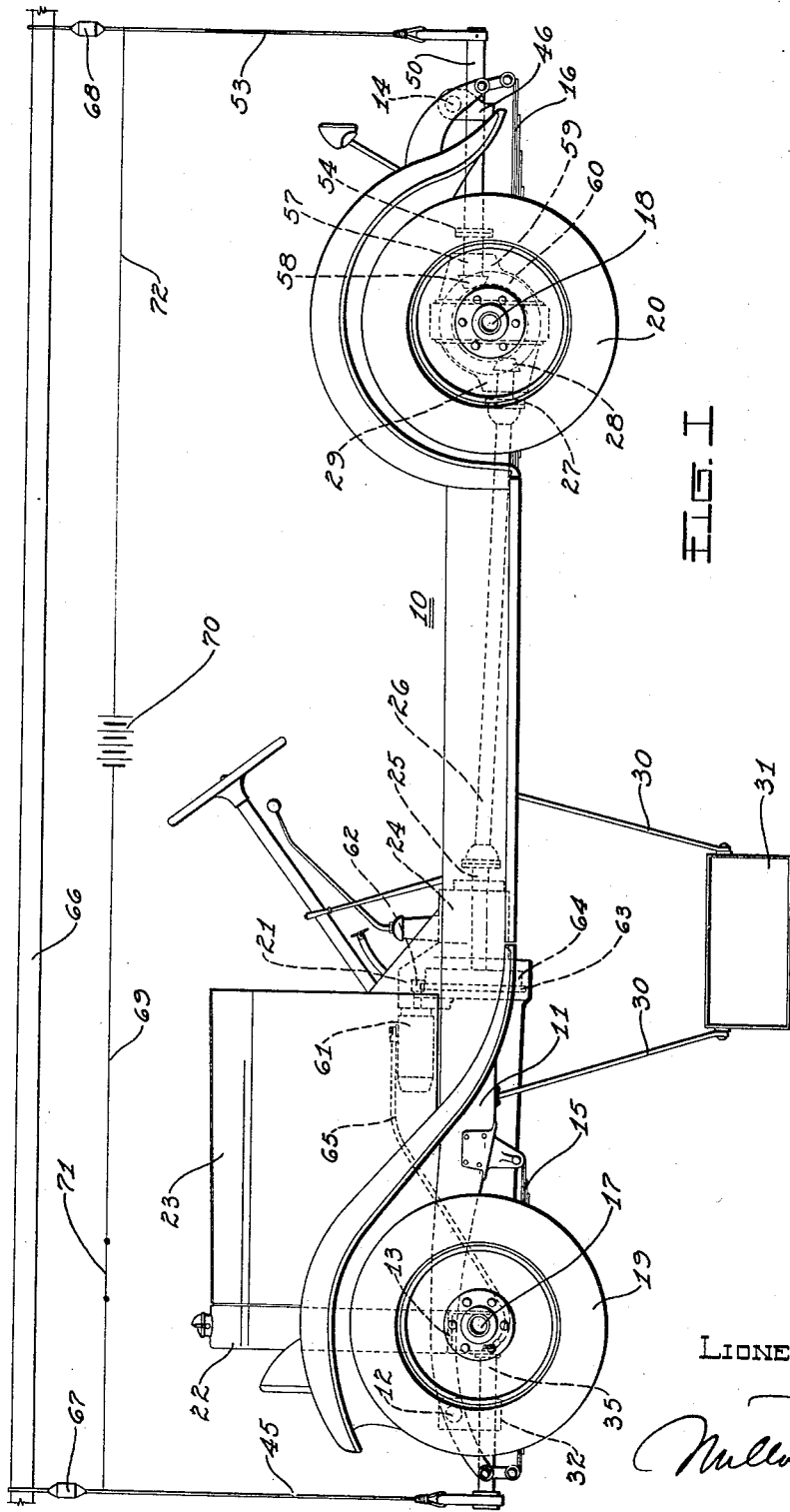
Fig. 1 is a side elevation of a motor vehicle chassis illustrating the invention as applied.

Referring to the drawings for more specific details of the invention, 10 represents generally a motor vehicle chassis comprising a frame having the conventional side members 11 connected by cross members 12, 13 and 14. As shown, the frame has shackled thereto front springs 15 and rear springs 16 supporting a front axle 17 and rear axle 18. The axles have mounted thereon in any suitable manner front wheels 19 and rear wheels 20.

Mounted on the frame is an engine 21, a radiator 22, and an engine bonnet 23. A transmission case 24 is bolted or otherwise secured to the crank case of the engine and a driven shaft 25 thereof is connected by a universal joint to one end of a driving shaft 26, the other end of which is connected by a suitable joint to a flange 27 on a driving pinion 28 suitably mounted in a carrier 29 of the differential.

Suitably secured to the side members of the frame and depending therefrom are arms or brackets 30 between which is pivotally supported a weight 31, for the purpose of counterbalancing the motor to permit the chassis to be supported substantially in the line of the frame.

Bolted or otherwise secured to the cross member 12 is a block 32. As shown, the block is formed from a suitable non-conductive or insulating material and is secured centrally on the cross member 12 as by bolts 33 and suitable compression plates 34.

Secured to the block 32 transversely with respect to the cross member 12 is a shaft 35 positioned substantially in the neutral longitudinal axis of the vehicle. The shaft 35 has one end secured to and suitably insulated from the cross member 13 as by bolts 36 and suitable insulating washers 37. The other end of the shaft has mounted thereon a bearing 38, the inner race 39 of which is positioned between two sleeves or rings 40 attached to the shaft as by bolts 41 and the outer race 42 of the bearing is secured in a ring 43 having an eye 44 in which is secured a cable 45, the object of which will hereinafter appear.

Secured to the cross bar 14 is a bracket 46 having formed therein a cup 47 positioned in which is a bearing 48. This bearing is secured in the cup by a ring 49 threaded therein and its axis is centrally positioned with respect to the cross member 14. Supported in the bearing 48 is a shaft 50 positioned transversely with respect to the cross member 14 and substantially in the neutral longitudinal axis of the chassis. The shaft 50 has bolted or otherwise secured to one end thereof a hanger arm 51 provided with an eye 52 in which is secured a cable 53, the object of which will also hereinafter appear.

The shaft 50 has formed thereon a flange 54 secured as by bolts 55 to a flange 56 on a shaft 57 having formed thereon a pinion 58. The usual differential case cover, not shown, has been removed and replaced by a differential carrier 59 (similar to the carrier 29) from which the differential gears have been removed. The carrier 59 has mounted therein the pinion 58 in mesh with a ring or differential gear 60, mounted in the carrier 29, and the pinion 28 is also in mesh with the gear 60, as shown in Fig. 1.

Figure 2:
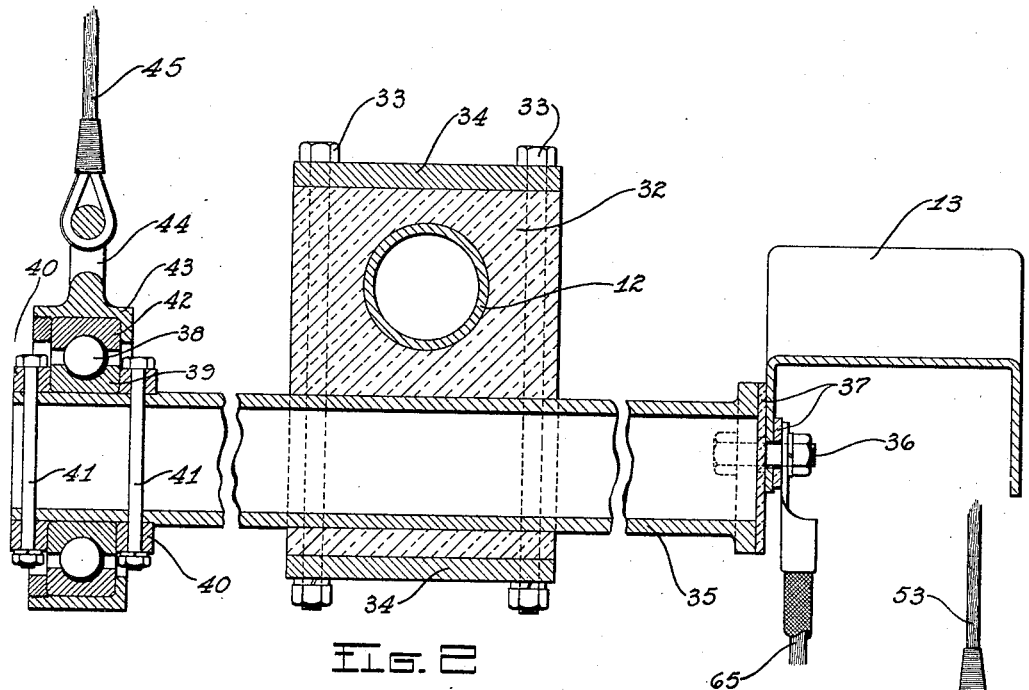
Fig. 2 is a vertical sectional view of the fixture positioned on the forward end of the chassis.
Figure 3:
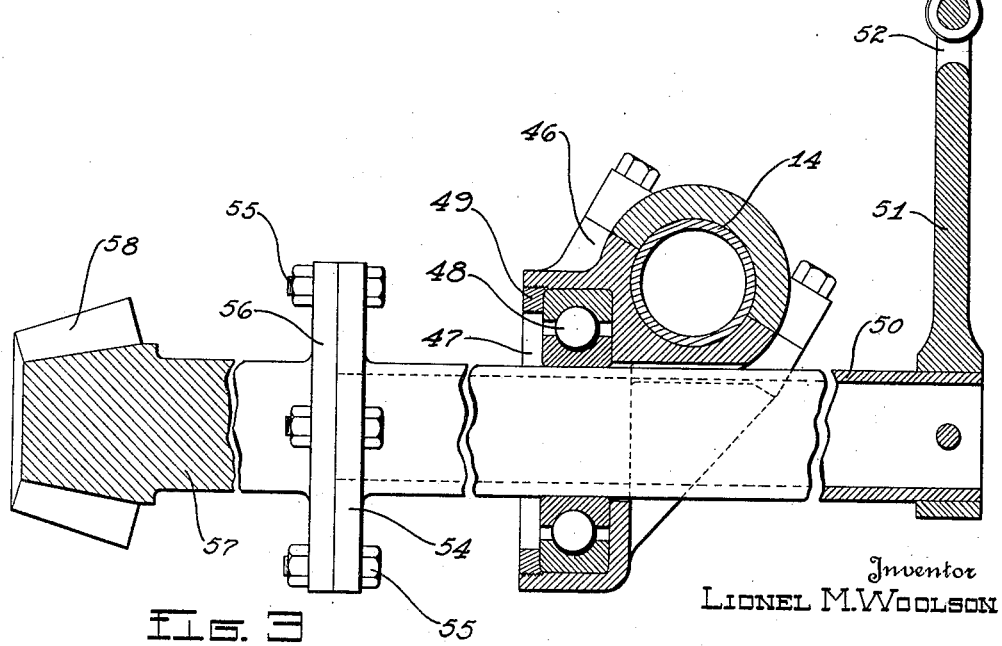
Fig. 3 is a vertical sectional view of the fixture positioned on the rear end of the chassis.

The engine is provided with the conventional starting motor 61 having a drive pinion 62 adapted to mesh with a ring gear 63 on the flywheel 64 of the engine. The starting motor is electrically connected as by a lead 65 to the shaft 35 and the starting motor is grounded on the frame in the conventional manner. As shown, the lead 65 has one end connected to the starting motor and its other end connected to the shaft 35 by one of the stud bolts 36 suitably insulated from the chassis frame as shown in Fig. 2.

The cables 45 and 53 are secured to a suitable support 66 with insulating members 67 and 68 interposed. These cables provide means for supporting the chassis or motor vehicle at a suitable elevation to permit free rotation thereof on the shafts 35 and 50, and the weight 31 serves to counter-balance the weight of the engine or other off-center mass.

The cable 45 is connected by a lead 69 to a suitable source of electric supply indicated at 70 with a switch 71 interposed and the cable 53 is connected by a lead 72 to the negative terminal of the source of supply. When the switch 71 is closed current flows from the source of supply 70 through the lead 69, the cable 45, the shaft 35 and the lead 65 to the starting motor 61 which is suitably grounded to the frame. From the starting motor the current flows through the frame, the shaft 50, the cable 53 and the lead 72 to the negative terminal of the source of supply.

Assuming that the engine clutch is in, that the transmission has been shifted or set for low or other speed and that the switch 71 is in a closed position, the starting motor is energized to impart motion to the crank shaft of the engine through the ring gear on the flywheel. The crank shaft is connected through the clutch to the transmission, the drive shaft 25 of which is connected to the driving shaft 26 to rotate the pinion 28 which meshes with and drives the ring gear 60 and causes it to travel around the pinion 58 secured in a fixed position on the shaft 57. Hence the chassis or vehicle is caused to rotate on the shafts 35 and 50 positioned in the longitudinal axis thereof.

Although the invention has been described in connection with a specific embodiment, the principles involved are susceptible of numerous other applications which will readily occur to the person skilled in the art. The invention is therefore to be limited only as indicated by the scope of the appended claims.

Having thus described the various features of my invention, what I claim as new and desire to secure by Letters Patent is:

1. A motor vehicle display comprising a fixed support, a motor vehicle including an engine and a starting motor positioned on the support for axial rotation on the support and means reacting against the fixed support for bodily rotating the vehicle through the starting motor.

2. A motor vehicle display comprising a fixed support, a motor vehicle including an engine, a ring gear operatively connected to the engine and a starting motor for the engine, positioned for rotation about its longitudinal axis on the support, and means connecting the starting motor to a source of electrical energy.

3. A motor vehicle display comprising a support having a fixed pinion, a motor vehicle including an engine, a differential operatively connected to the engine and a starting motor for the engine, said vehicle positioned for rotation on the support with the driving gear of the differential in mesh with the fixed pinion, and means for energizing the starting motor.

4. A motor vehicle display comprising a support, a fixed pinion on the support, a motor vehicle including an engine, a differential operatively connected to the engine and a driving motor for the engine, said vehicle positioned for rotation on the support, the differential having its driving gear in mesh with the fixed pinion, and means for energizing the starting motor.

5. A motor vehicle display comprising means supporting a motor vehicle on its longitudinal axis, said vehicle including an engine, a differential operatively connected to the engine and a starting motor for the engine, a fixed pinion on the supporting means meshing with the driving gear in the differential and means connecting the starting motor of the vehicle to a suitable source of electrical energy.

6. A motor vehicle display comprising oppositely disposed supports, means for retaining one of the supports in a fixed position, a pinion secured to the fixed support, a motor vehicle including an engine, a differential operatively connected to the engine and a starting motor for the engine positioned for rotation on the supports and having the driving gear of its differential in mesh with the pinion on the fixed support and means for energizing the starting motor.

7. A motor vehicle display comprising a fixed support, a pinion on the fixed support, a rotatable support arranged in oppositely disposed relation to the fixed support, a motor vehicle including an engine, a differential operatively connected to the engine and a starting motor for the engine positioned on the supports for longitudinal rotation, the differential having its driving gear in mesh with the pinion on the fixed support and means connecting the starting motor to a source of electrical energy.

8. A motor vehicle display comprising a fixed support, a pinion positioned thereon, a rotatable support arranged in oppositely disposed relation to the fixed support, a motor vehicle including an engine, a differential operatively connected to the engine and a starting motor for the engine, said vehicle positioned on the support for longitudinal rotation, a counter balance for the vehicle, the differential having its driving gear in mesh with the pinion on the fixed support, and means including the rotatable support for connecting the starting motor to a source of electrical energy.

9. A motor vehicle display comprising a fixed support, a pinion permanently secured thereon, a rotatable support arranged in oppositely disposed relation to the fixed support, a motor vehicle having one end thereof secured to the rotatable support and the other end thereof mounted for rotation on the fixed support, said motor vehicle including a frame, an engine, a differential operatively connected to the engine and a starting motor for the engine, a weight suspended from the frame, the differential having its driving gear in mesh with the pinion on the fixed support, and means including the rotatable support connecting the starting motor to a suitable source of electrical energy.

10. In a display mechanism, the combination of a support, a device to be displayed positioned for rotation on its longitudinal axis on the support, means connecting the support with the device for supporting the latter from the former, and a motor on the device for bodily rotating the device on its longitudinal axis relative to the support.

11. In a display mechanism, the combination of a support, a device to be displayed, means connecting the support with the device for supporting the latter from the former comprising flexible cables, an electric motor on the device receiving current through said cables, and means connecting the motor to rotate the device relative to the support.

12. In a display mechanism, the combination of a support comprising a shaft having a fixed pinion, a device to be displayed mounted for axial rotation about the axis of said pinion, a motor on said device geared to said fixed pinion to bodily rotate the device relative to the support, and means for energizing the motor.

13. In a display mechanism, the combination of a support comprising a shaft having a fixed pinion, a device to be displayed mounted for rotation about the axis of said pinion, a motor on said device geared to said fixed pinion to rotate the device relative to the support, a source of current on the support, and connections from said source to the motor including a connection through said shaft.

14. A motor vehicle display comprising a fixed support, an engine powered vehicle mounted substantially on its longitudinal axis for bodily rotation on said support, a motor carried by and forming a permanent part of the vehicle, and means for rotating the vehicle about its longitudinal axis through operation of the said motor.

15. In a display device comprising a support, a vehicle mounted substantially on its longitudinal axis for rotation on the support, and means for rotating the vehicle substantially about its longitudinal axis under its own power.

16. In a display device for engine driven vehicles having a transmission mechanism, means supporting the vehicle substantially on its longitudinal axis, means connected to the transmission mechanism and associated with the support for causing the vehicle to rotate about its longitudinal axis when said transmission mechanism is driven, and means for driving the transmission mechanism.

17. In a display device for a motor vehicle having an engine and a transmission mechanism operatively connected thereto, means supporting the vehicle substantially on its longitudinal axis, means connected to the transmission mechanism and associated with the support for causing the vehicle to rotate about its longitudinal axis when said engine is driven, an auxiliary motor for driving the engine, and means for energizing the auxiliary motor.

18. In a motor vehicle display comprising means supporting a vehicle substantially on its longitudinal axis, said vehicle including an engine and a starting motor for the engine, a differential, transmission mechanism connecting the engine with the differential, means associated with the differential and with the supporting means for causing the vehicle to rotate axially and bodily when the starting motor is in operation, and means connecting the starting motor with a source of electrical energy.

In testimony whereof I affix my signature.

LIONEL M. WOOLSON.